(12) United States Patent
Silbernagel et al.

(10) Patent No.: US 8,850,997 B2
(45) Date of Patent: Oct. 7, 2014

(54) PLANTER AND METHOD OF OPERATING A PLANTER WITH INDIVIDUAL METER CONTROL

(75) Inventors: Carl Silbernagel, Moline, IL (US);
James R. Peterson, Annawan, IL (US);
Dave J. Rylander, Victoria, IL (US);
Michael E. Frasier, East Moline, IL (US)

(73) Assignee: Deere & Company, Moline, IL (US)

( * ) Notice: Subject to any disclaimer, the term of this patent is extended or adjusted under 35 U.S.C. 154(b) by 522 days.

(21) Appl. No.: 13/093,037

(22) Filed: Apr. 25, 2011

(65) Prior Publication Data

US 2012/0266795 A1 Oct. 25, 2012

(51) Int. Cl.
*A01C 7/00* (2006.01)
*A01C 7/20* (2006.01)
*A01C 7/04* (2006.01)
*A01C 7/10* (2006.01)

(52) U.S. Cl.
CPC . *A01C 7/105* (2013.01); *A01C 7/20* (2013.01); *A01C 7/046* (2013.01)
USPC .......................................... 111/185; 111/200

(58) Field of Classification Search
USPC ........................................ 111/174, 200, 185
See application file for complete search history.

(56) References Cited

U.S. PATENT DOCUMENTS

| | | | |
|---|---|---|---|
| 4,928,607 A | 5/1990 | Luigi | |
| 5,170,909 A | 12/1992 | Lundie et al. | |
| 6,651,570 B1 | 11/2003 | Thiemke | |
| 6,715,433 B1 | 4/2004 | Friestad | |
| 6,752,095 B1 | 6/2004 | Rylander et al. | |
| 7,040,242 B2 * | 5/2006 | Memory | 111/173 |
| 7,185,596 B2 | 3/2007 | Thiemke et al. | |
| 7,395,769 B2 | 7/2008 | Jensen | |
| 7,617,785 B2 | 11/2009 | Wendte | |
| 7,735,438 B2 | 6/2010 | Riewerts | |
| 7,938,075 B1 * | 5/2011 | Glendenning et al. | 111/200 |
| 2002/0170476 A1 * | 11/2002 | Bogner et al. | 111/183 |
| 2004/0134399 A1 | 7/2004 | Stephens et al. | |
| 2010/0043685 A1 * | 2/2010 | Gogerty et al. | 111/200 |

FOREIGN PATENT DOCUMENTS

| | | |
|---|---|---|
| DE | 102006028573 | 12/2007 |
| DE | 202010000159 | 5/2010 |
| EP | 1579754 | 9/2005 |
| EP | 1886548 | 2/2008 |
| WO | 2008135772 | 11/2008 |

OTHER PUBLICATIONS

European Search Report received Aug. 17, 2012, ( 4 pages).

* cited by examiner

*Primary Examiner* — Alicia Torres

(57) ABSTRACT

A planter is described which utilizes individual seed meter motor drives at each row unit. motor controllers control each seed meter drive motor. Each individual row seed meter can be individually started, stopped and operated at a unique rate. Prior to planting, the meters can be operated to fill the meters and ensure that the meters are primed and ready to start dropping seed as soon as the planter begins operation to plant seed. When a seed delivery system is used with each meter to move seed from the meter to the soil, the delivery system is also primed with seed before operation of the planter.

3 Claims, 5 Drawing Sheets

PLANTER AND METHOD OF OPERATING A PLANTER WITH INDIVIDUAL METER CONTROL

FIELD

A seeding machine, such as a planter, and a method of operating the seeding machine, is disclosed.

BACKGROUND

Agricultural planter's are designed to plant crops such as corn, soybeans, cotton, peanuts and other crops. Modern planters typically are 12 or more rows in width. The overall width of these planters require that they have flexible frames to follow the contours of the ground and to fold for a narrower transport width. The row units on a planter will typically include, among other components, a seed meter. Seed meters perform a central function in the precise placement of seeds in the ground. Precise and accurate seed placement is factor in crop yield which in turn is factor in farm profitability.

Seed meters are usually driven by mechanical or hydraulic-mechanical systems and may include numerous complex drive chains and drive shafts to transmit the power from a central power source to the individual row units. The flexibility and folding features of the planter frame further complicate mechanical power distribution. From a manufacturing perspective, these systems require a significant amount of hand assembly, reducing manufacturing efficiency and increasing planter costs. From a planter performance perspective, these systems have inherent backlash, windup and compliance which manifests in a variability of rotation of the seed meter device and ultimately have a negative influence on seed placement precision and accuracy. With these mechanically driven systems, as planting speed increases, the seed placement accuracy decreases.

Timely planting is also critical to crop yield and farm profitability. A narrow, optimal window for planting occurs each planting season. Paradoxically, while it is important to limit planting speed for proper seed placement, it is equally important to increase planting speed to plant within the optimal time available.

In addition to the seed placement issue, it may also be desirable, for agronomic reasons, to plant individual rows at different rates or variable rates. To accomplish variable rate planting at each row using a centralized mechanical or hydro-mechanical power source becomes very complex and impractical. At best, variable rate drive systems are practical in multiple row sections, not at the individual row unit. To be practical, a variable rate or individual row unit rate adjustment must be possible on-the-go, that is, while the planter is in operation.

Some crops are planted in twin rows in which the seeds are planted in pairs of rows spaced relatively close together with larger spaces between the pairs. Because of the narrow spacing of the twin rows, the twin row units are spaced fore and aft where one of the twins is placed ahead of the other twin relative to the planter frame. Agronomically, because of the narrow spacing between the twins, it is desired to stagger or synchronize the placement of the seeds in the twin pair. Seed meter synchronization is a function of population. That is, as the population changes, the synchronization relationship between the twin meters also changes. On a mechanically driven system, the synchronization relationship is changed by mechanically adjusting the twin meters relative to on another. To adjust the twin rows on-the-go is extremely complex and impractical. The current method is to stop planting and manually adjust one or both seed meters of each twin pair.

Crop input costs also affect farm profitability. As input costs increase, and as farm sizes increase, the economic impact of waste becomes significant. Seed costs are an example of inputs that continue to rise. With planters, seed waste occurs due to spilling seed on the ground when filling the meter seed disks prior to planting, overshooting the target population when starting the meters, delay in stopping the meters and overplanting in areas of lower population. Similarly, cropland is not fully utilized if there are skips in the field where seed is under-planted or simply not planted. Mechanical or hydro-mechanically driven systems can be identified as a cause of these wastes.

Electric driven seed meter can be useful in overcoming some of the above problems. An example of such a drive is seen in U.S. Pat. No. 4,928,607. Another example is WO 2008/135772 which shows individual row units with their respective row unit motor controller and a master controller. These give independent control of the motors as shown in U.S. Pat. No. 7,395,769.

SUMMARY

The planter described below utilizes individual seed meter motor drives at each row unit. Row unit motor controllers individually control each seed meter drive motor. The row unit motor controller receives commands from, and sends information back to, a central master controller. Through the system of communication between row unit motor controllers and the master controller, each individual row seed meter can be individually started, stopped and operated at a unique rate. Prior to planting, the meters can be operated to fill the meters and ensure that the meters are primed and ready to start dropping seed as soon as the planter begins operation.

DETAILED DESCRIPTION

Figure 1:
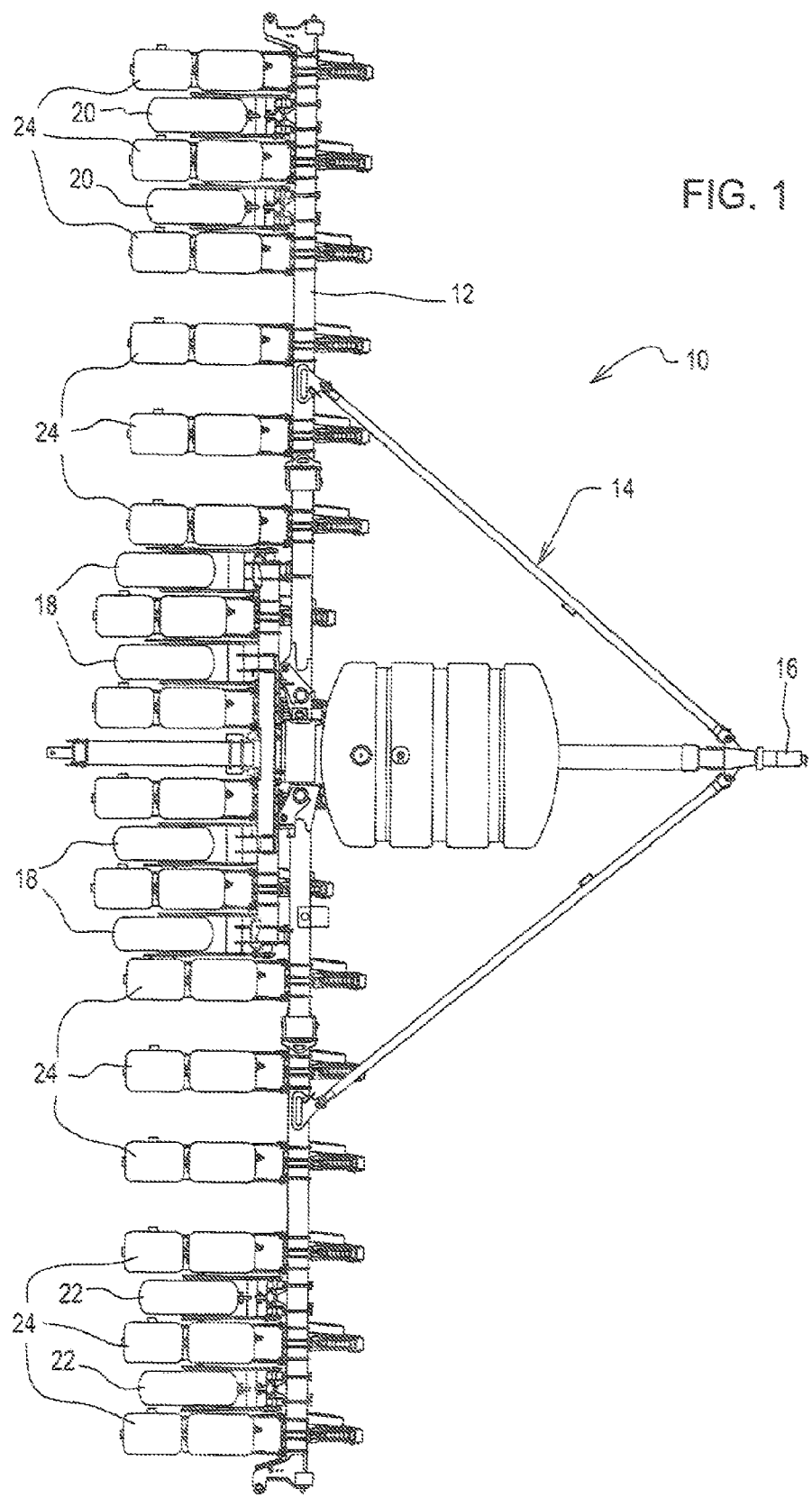
FIG. 1 is a perspective view of a row unit of the planter.
Figure 2:
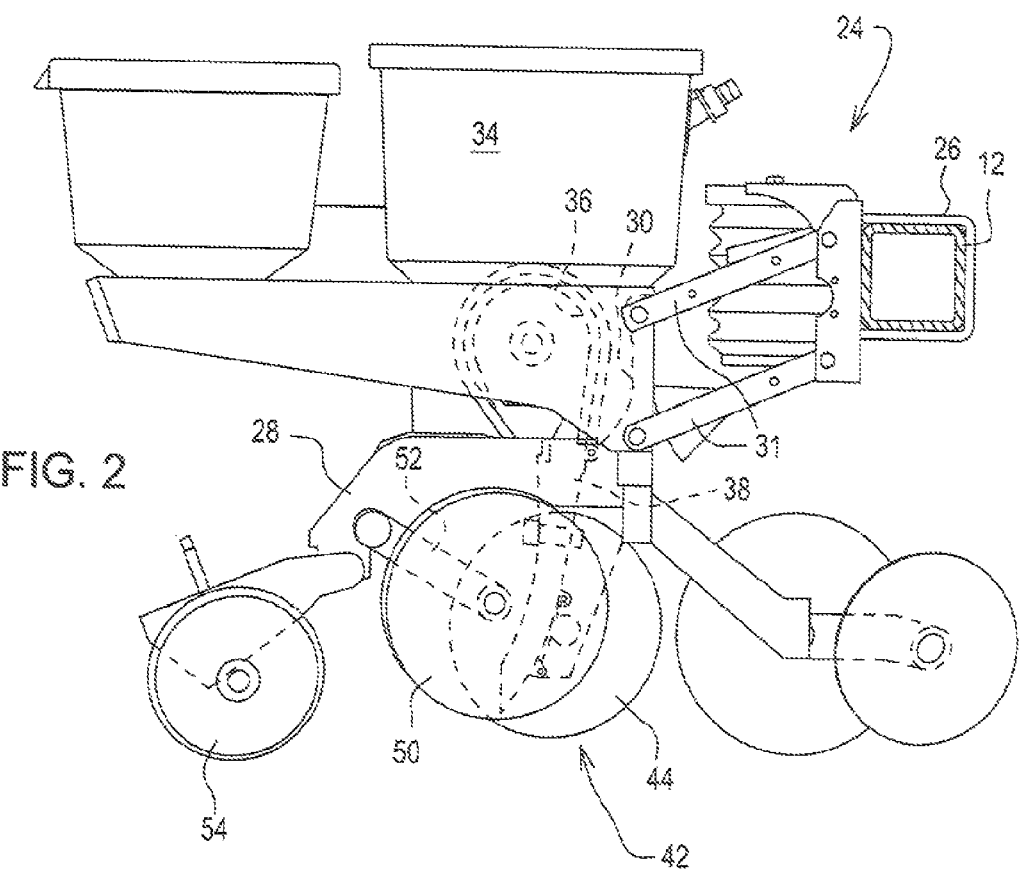
FIG. 2 is a perspective view of the row unit seed meter, hopper and meter drive.

With reference to FIG. 1, a seeding machine is shown in the form of a row crop planter 10. Planter 10 includes a tool bar 12 as part of a planter frame 14. The frame includes a tongue 16 by which the planter is coupled to a tractor, not shown. Supporting the planter frame 14 are three sets of ground engaging wheels. The center set has four wheels 18 while a left set has two wheels 20 and the right set has two wheels 22. Mounted to the tool bar are multiple planting row units 24. Row units 24 are typically identical for a given planter but need not be identical. A row unit 24 is shown in greater detail in FIG. 2. The row unit 24 is mounted to the tool bar 12 by U-bolts 26. The row unit 24 is provided with a central frame member 28 having a pair of upwardly extending arms 30 at the forward end thereof. The arms 30 connect to a parallel linkage 31 for mounting the row unit 24 to the tool bar 12 for up and down relative movement between the row unit 24 and the toolbar 12 in a known manner.

Seed is stored in seed hopper 34 that receives seed from a central source through the tube 38. Alternatively, a larger seed hopper can be provided on each row unit. Seed flows from the hopper 34 to a seed meter 36. Seed meter 36 functions to singulate seed from the hopper 34 and deliver individual seeds to a seed tube (not shown). The seed drops through the tube and falls from the open lower end thereof, positioned just above a seed trench formed by a trench opener 42. The trench opener 42 includes a pair of disks 44 that are mounted on axes inclined to one another such that the disks 44 meet at a point at the lower front portion of the disks. The seed tube is located between a rear portion of the two disks 44 of the trench opener. A gauge wheel 50 is positioned on the outer side of opener disks 44 and positioned slightly rearward of the disks 44. The gauge wheels 50 are adjustably mounted to the row unit frame by arms 52 that enable adjustment of the vertical position of the gauge wheels 50 relative to the opener disks 44. This establishes of the depth to which the openers are inserted into the soil, i.e. the depth of the seed trench. After seed drops through the seed tube 38 into the trench, a pair of closing wheels 54, located rearward of the gauge wheels 40 close the trench over the seed. The above described row unit is an example. Other structures and arrangement of the openers, gauge wheels, seed meter, seed tube, etc. are known and can be used in place of that shown and described above.

Figure 3:
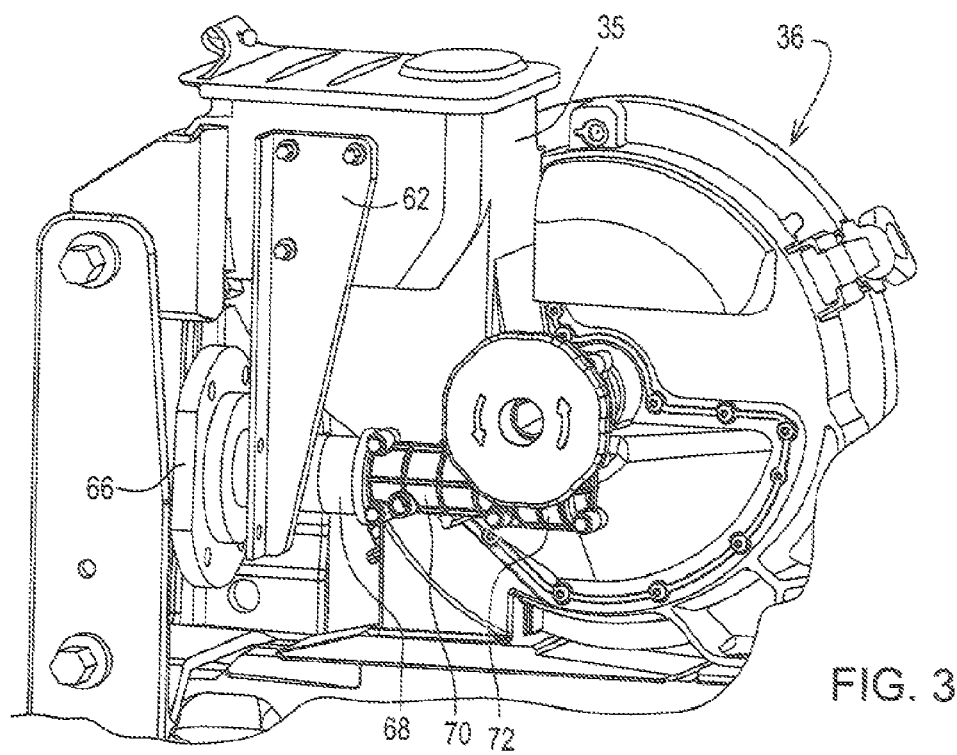
FIG. 3 is an enlarged view of the seed meter and drive for the meter.

With reference to FIG. 3, an alternative arrangement of the row unit is shown. Here, in place of a large seed hopper 34, a smaller, min-hopper 35 is shown mounted to the seed meter 36. The seed hopper 35 is mounted to the side of the seed meter 36 housing. Mounted to the hopper, by bracket 62, is an electric motor 66. The motor output shaft is contained in a cylindrical portion 68 of the motor housing and is connected to the drive input 70 of gearbox 72. The gearbox 72 is like or similar to the gearbox shown in U.S. Pat. No. 6,715,433 and incorporated herein by reference. The output of the gearbox 72 is coupled to the seed meter shaft to thereby drive the seed meter. The seed meter 36 shown is a vacuum meter having a rotating metering disk as shown in U.S. Pat. No. 5,170,909, also incorporated herein by reference. Other types of meters can be used such as a finger pick-up meter, a belt meter, etc.

Row unit 24 is provided with a motor 66. By separately controlling each motor 66, each seed meter can be operated independently and at a different speed from the other seed meters. A control system 80 for the seed meter motors is shown in FIG. 3. A seed meter master controller 82 is connected by a bus 84 to each of the individual row unit motor controllers 86. The first twenty four row unit motor controllers are connected to the master controller by the bus 84. An additional bus 90 couples additional row unit motor controllers 88 to the master controller 82. Additional controllers and communication buses can be added up to the capacity of the master controller 82. The master controller 82 communicates individual seed population commands to each of the row unit motor controllers 86, 88.

A communication bus 92 connects a primary seed monitor 94 and an auxiliary seed monitor 96 to the seed meter master controller 82. The seed monitor 94 is connected by a bus 98 to seed sensors 100. Up to twenty four seed sensors 100 are provided with one seed sensor 100 for each row up to twenty four having a sensor 100. Additional seed sensors 102 for additional rows beyond 24 are connected via bus 104 to the auxiliary seed monitor 96. The seed sensors 100 and 102 are typically located on the seed tubes 38 of each row unit and detect the passage of seed and produce an output signal in response thereto. The seed monitor 94 and auxiliary seed monitor 96 receive and process the output signals from the seed sensors and communicate that information to the virtual terminal 106, preferably located in the cab of the tractor pulling the planter. The seed sensor information is also communicated to the master controller 82 for use in commanding operation of the individual motor controllers 86, 88. If desired, the signal processing functions of the seed monitors 94 and 96 can be integrated into the master controller 82.

Planter speed information is further provided to the seed meter master controller 82 by a left speed sensor 110 and a right speed sensor 112. The left and right speed sensors can be rotary encoders attached to left and right ground wheels 20, 22 of the planter. Other types of speed sensors can be used as well, such as ground radar, position and time data from global positioning satellites, etc. The speed information is used by the master controller to command the individual row unit motor controllers to provide the desired seed population. Furthermore, the difference between the left speed sensor and the right speed sensor is used to determine a curved path of the planter. Since the outside row units will travel a greater distance on a curve than the inside row units, the master controller will command a faster speed for the seed meters on the outer row units than the speed on the inside row units to maintain a desired in-row seed spacing for each row. The use of individual seed meter electric motor drives enables the speed of each seed meter to be adjusted as the path of the planter changes to maintain the desired seed spacing for each row of the planter. Such precise seed spacing control has previously not been possible with the use of a common mechanical or hydraulic-mechanical seed meter drives.

Further inputs to the seed meter master controller 82 include vehicle location information through a global positioning system 114 or other local positioning system. Field map information 116 is also provided to the seed meter master controller. The field map information 116 can include the field boundaries, waterways, grasslands and other areas not to be planted as well as seed prescription information related to the desired or optimal seed population for particular areas of the field. For example, as soil types vary, different seed populations may be desired. With electronic control of the seed meter drive motors 66, the seed population can be varied according to the prescription and implemented by the master controller on-the-go as the planter is moved through the field. A further use of on-the-go seed rate adjustment can be to increase the seed population on rows adjacent to the edge of the field that receive a greater amount of sunlight and thus have a greater production capacity.

The seed meter 36 has a metering member, such as a disk shown in the previously mentioned U.S. Pat. No. 5,170,909. The disk has a plurality of apertures extending through the disk between the opposite sides thereof. In the meter housing, a pool of seed is provided adjacent on side of the disk near the lower portion of the disk. A reduced air pressure, or vacuum, is provided on the opposite side of the disk. As the disk rotates, seeds are adhered to the apertures by the vacuum or air pressure differential. Once the seeds on the disk are rotated to a drop location, the vacuum is terminated and the seeds fall from the disk into the seed tube 38. When beginning to plant, the seed disk in the seed meter is first filled with seed. This is accomplished by first turning on the vacuum, then driving the seed disks. When the planter is then put in the ground, seed can be dispensed immediately, rather than driving a several feet or meters in the field before the disk is filled and seeds begin to drop into the seed tube. With prior mechanical drive systems, it was necessary to rotate the disks and allow some seed to spill to the ground from one meter while the meters were operated to ensure that all meters were filled or primed with seed. With the planter shown, having individual row electric motors to drive the meters, it is possible to prime the meters, and as soon as the first seed falls and is detected by the associated seed sensor 100, that meter is stopped. This avoids spilling of seed while the other meters are primed.

While this meter priming process has been described in the context of a vacuum meter with a disk, it is necessary to prime other types of meters as well such as a finger pick-up meter, belt meter, etc. Each type of meter collects seed from a seed pool and moves seed to a discharge location where the seed is discharged from the meter. While the seeding machine has been described in the context of electric motors to drive the seed meter, it will be appreciated that hydraulic, pneumatic or other motors capable of being electrically controlled can be used herein.

Figure 4:
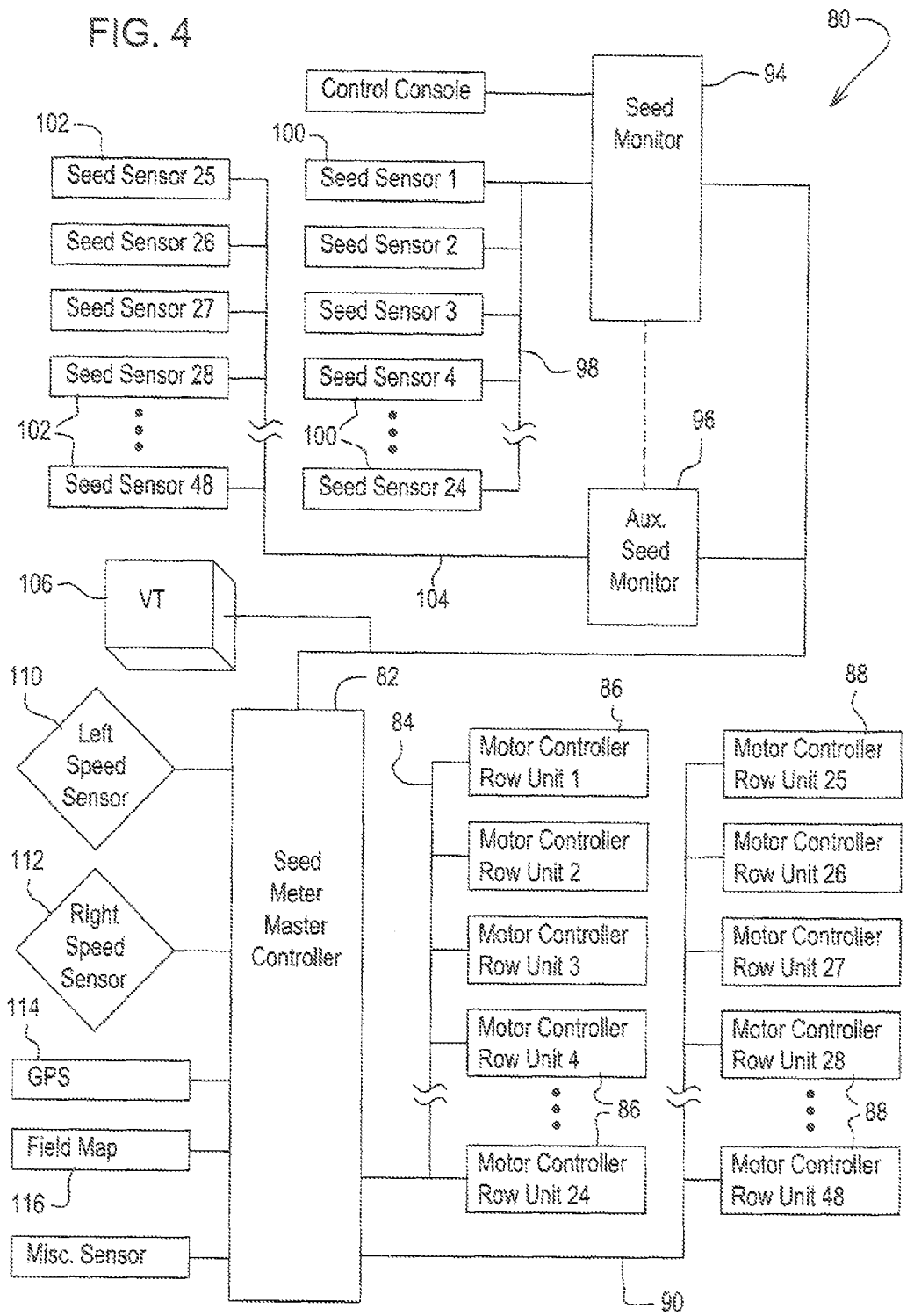
FIG. 4 is a schematic view of the control system.
Figure 5:
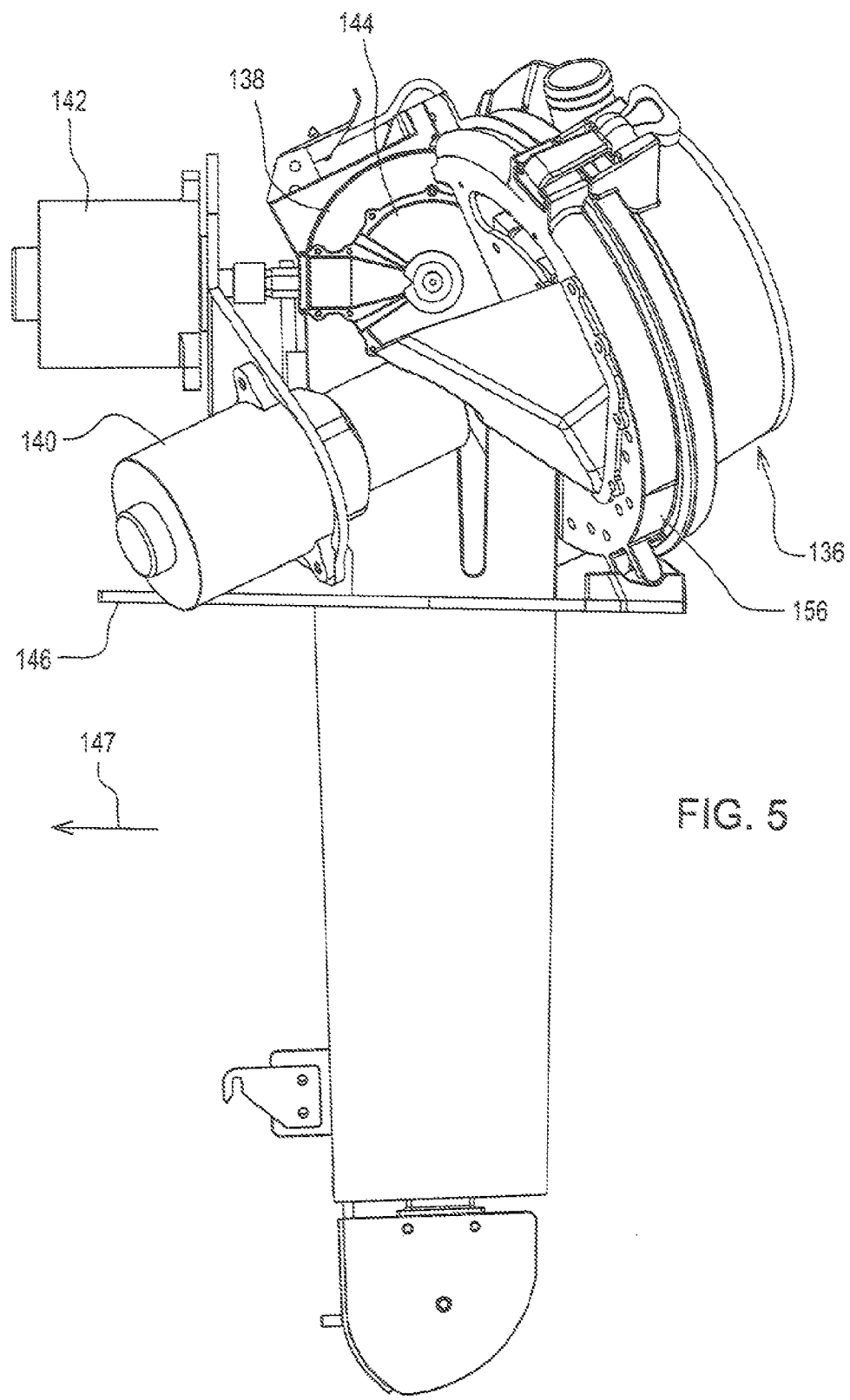
FIG. 5 is a side view of another planter row unit having a seed meter and seed delivery system.
Figure 6:
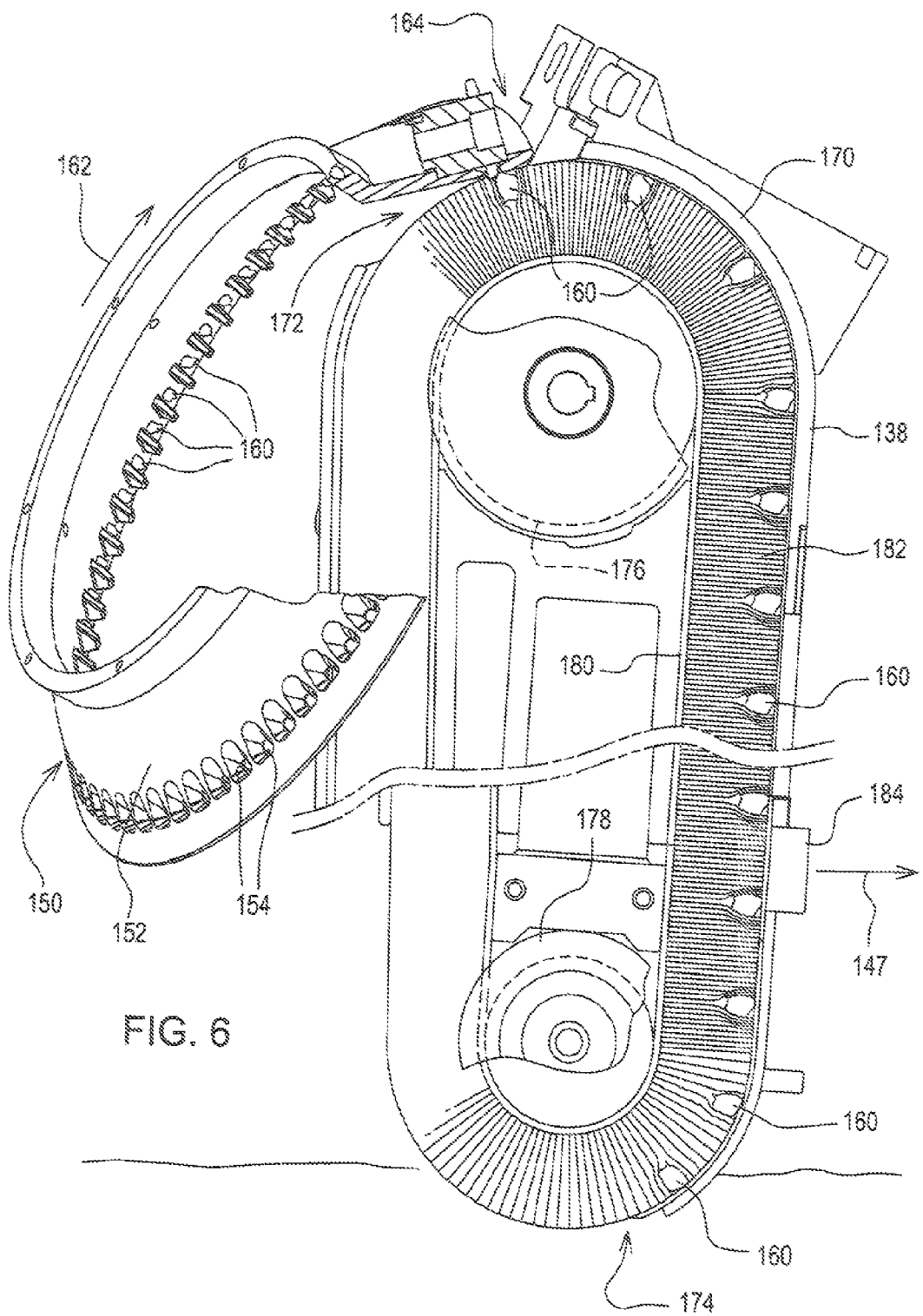
FIG. 6 is a cut-away view of the seed meter and delivery system of FIG. 5 illustrating the internal components thereof.

With reference to FIGS. 5 and 6, a portion of another row unit is shown. A seed meter 136 is shown associated with a seed delivery system 138. The seed meter 136 is driven by a motor 140 while the delivery system 138 is driven by a motor 142. The motor 142 is connected to the delivery system 138 through a right angle drive 144. The seed meter, the delivery system, and the motors are supported by a multifaceted mounting bracket 146 that is coupled to a row unit frame such as the frame 28 shown in FIG. 2. The seed meter and delivery system are adapted to move through a field in the direction indicated by the arrow 147. The meter motors 140 and the delivery system motors 142 are controlled by a control system such as that shown in FIG. 4 with appropriate adaptation to operate two motors per row unit. As will be readily apparent, the motors may be electric motors or other types of motors such as hydraulic, pneumatic, etc that are capable of electronic control.

The seed meter 136 includes a seed metering member 150 having a side wall 152 with an array of apertures 154 extending through the side wall 152. A pool of seed is contained by the seed meter housing 156 and the inner surface of the side wall 152 at a lower portion thereof. Seed 160 from the seed pool is adhered to the inner surface of the side wall 152 as a result of vacuum being applied to the outer side of the side wall. As the metering member 150 rotates as shown by the arrow 162, seed is carried upward from the seed pool to an upper portion of the metering member where the seed is released at a release position 164. At the release position, the seed is taken by the delivery system 138.

The delivery system includes a housing 170 having an opening 172 at the upper end and an opening 174 at the lower end. Inside the housing, pulleys 176 and 178 support and drive a brush belt 180. The brush belt has a plurality of bristles 182 into which seed 160 is inserted at the release position 164. The seed 160 is then carried by the brush 180 the lower end where, it is discharged through the lower opening 174. A seed sensor 184 on the delivery system housing detects the seed 160 as the seed passes the seed sensor 184.

In the seed meter priming operation, the seed meter is operated to fill the apertures 154 of the metering member 150 between the seed pool and the release position 164. In addition, the delivery system 138 is operated to fill the brush with seed so that when the seeding machine begins a planting operation to plant seed by moving over the soil, seed 160 is immediately discharged from the delivery system 138. During operation of the seeding machine, the brush belt 180 is operated at a speed appropriate to impart a horizontal rearward velocity to the seed 160 approximately equal to the forward travel speed of the seeding machine. Thus, the speed of the brush belt 180 is a function of the forward travel speed of the seeding machine. The travel speed of the seeding machine and the seed spacing in the ground determines the number of seeds and the spacing of the seeds in the belt. Since of the sensor 184 is spaced above the opening 174, the meter and delivery system are operated in the priming process such that a predetermined number of seeds will be contained in the brush belt 180 between the sensor 184 and of the opening 174. The intended travel speed and the seed population are input in the control system by the operator. Thus, when priming of the meter and delivery system, the meter and brush will be operated after the first seed is detected for a predetermined number of seeds to fill the brush.

After planting, when turning the planter 10 off, i.e. shut off the vacuum to the row units, the seed adhered to the inner surface of the metering member 150 will fall from the metering member to the seed pool at the bottom of the metering member. It will be necessary to remove seed in the brush belt of the delivery system. This can be accomplished by operating the delivery system and discharging the seed 160 onto the ground. To avoid waste of seed, the delivery system is operated in reverse, returning the seed through the upper opening 172 back into the seed meter where it falls to the seed pool.

Having described the seeding machine, it will become apparent that various modifications can be made without departing from the scope of the accompanying claims.

What is claimed is:

1. A seeding machine adapted to be moved over soil in a planting operation to plant seed, the machine comprising:
    a row unit having a trench opener, seed meter, and a motor to drive the seed meter; and
    a control system including a seed sensor associated with the seed meter, the control system adapted to operate the motor, prior to operation of the seeding machine to plant seed, to drive the seed meter in a priming operation to fill the seed meter with seed and to stop the motor in response to seed being detected by the associated seed sensor whereby when beginning a planting operation moving the seeding machine over a field, seed is immediately discharged from the seed meter;
    a seed delivery system for the seed meter, the seed delivery system adapted to hold and move seed between the seed meter and the soil;
    a delivery system motor to drive the seed delivery system; and
    wherein the control system is adapted to operate the delivery system motor during the priming operation to drive the delivery system to fill the delivery system with seed and to stop the delivery system motor in response to seed being detected by the associated seed sensor.

2. The seeding machine of claim 1 wherein the control system stops the delivery system motor in the priming operation after a predetermined number of seeds have been detected.

3. The seeding machine of claim 1 wherein the control system is adapted to operate the delivery system in reverse to return seed held by the delivery system back to the seed meter.

* * * * *